United States Patent [19]

Viriyayuthakorn et al.

[11] Patent Number: 4,495,022
[45] Date of Patent: Jan. 22, 1985

[54] EXTRUSION METHOD AND APPARATUS

[75] Inventors: Montri Viriyayuthakorn, Hamilton Township, Mercer County, N.J.; Robert V. DeBoo, Atlanta, Ga.

[73] Assignee: AT&T Technologies, Inc., New York, N.Y.

[21] Appl. No.: 413,301

[22] Filed: Aug. 31, 1982

[51] Int. Cl.³ .................. B29C 19/00; H01B 7/02; A21C 3/00; A01J 21/00

[52] U.S. Cl. ................ 156/500; 156/244.11; 156/244.12; 156/51; 425/133.1; 425/381; 425/466

[58] Field of Search ............... 156/500, 244.11, 0.12, 156/0.13, 0.21, 0.22, 0.23, 51; 425/462, 466, 133.1, 381, 133.5, DIG. 243, 113; 264/174 R, 209.2, 209.3, 209.4

[56] References Cited

U.S. PATENT DOCUMENTS

| 3,860,686 | 1/1975 | Myers | 264/174 R |
|---|---|---|---|
| 4,047,868 | 9/1977 | Kudo et al. | 425/133.1 |
| 4,171,195 | 10/1979 | Klein et al. | 425/466 |
| 4,172,106 | 10/1979 | Lewis | 425/381 |
| 4,279,851 | 7/1981 | Lord et al. | 156/244.13 |
| 4,279,857 | 7/1981 | Feuerherm | 425/381 |
| 4,303,734 | 12/1981 | Sullivan | 425/381 |
| 4,339,298 | 7/1982 | Kanotz et al. | 156/244.12 |

OTHER PUBLICATIONS

Bradley—"Spiderless Head Upgrades Quality in Coextrusion", *International Plastics News*, 12/81, p. 34.

Primary Examiner—Michael Wityshyn
Assistant Examiner—Louis Falasco
Attorney, Agent, or Firm—J. F. Spivak

[57] ABSTRACT

A diverter and coextrusion diverter are described which include means for adjusting the cavity of the diverter so as to control the uniformity of extrudate exiting the diverter. The diverter including a gap having beveled opposing faces.

24 Claims, 3 Drawing Figures

EXTRUSION METHOD AND APPARATUS

TECHNICAL FIELD

This invention relates to methods and apparatus for forming uniform extrudates and particularly to methods and apparatus for extruding tubular jackets about cables and the like.

BACKGROUND OF THE INVENTION

While the present invention is useful generally wherever uniform extrusion of an extrudate onto a substrate is desired, the invention will be discussed primarily with regard to extruding tubular jackets about cables such as those used in the telecommunications industry.

In the manufacture of telecommunications cable a protective plastic jacket is often extruded over a stranded cable core. This is generally done with an extruder of the type having a crosshead. A crosshead serves to redirect and to reconfigure a stream of plastic fluid, usually cylindrically or rod shaped, into a tubular shape about the cable. This reconfiguration is generally performed with the use of a diverter tube that is seated within a cylindrical cavity of a crosshead block. The interior surface of the diverter tube is sized to receive the cable which is passed linearly therethrough, or to receive a core tube through which the cable is passed, while its generally cylindrical exterior surface is provided with raised lands that define channels. These channels are shaped so as to redirect the flow of plastic fluid introduced into the crosshead some 90° and to divide it into two or more streams that are routed to a plurality of diverter tube channel passages spaced radially along the cylindrical cavity. From here the configuration of the raised lands is such as to permit the plastic fluid to spread into a tubular confluent that is drawn down upon the cable core just outside the extruder die.

As the fluidic plastic material must ordinarily follow a flow path having changes in both direction and path size, varying flow and balance conditions are inherently created. These flow and balances, wherein various portions of the flow at any one point along the path travel at different speeds, create circumferential variations in the thickness of the wall of the tubular confluent once it has solidified into a jacket. Since some minimum wall thickness is required for proper cable performance, these circumferential variations in jacket thickness must be compensated for by an increase in the average wall thickness. This, of course, increases manufacturing costs.

The just described problem of wall thickness variations in extruded, tubular jackets has heretofor been recognized and attempts made at providing solutions. These solutions have taken the form of crosshead designs that divide the stream of plastic fluid delivered to the crosshead into several smaller branch streams that are routed circumferentially about the cable and then recombined into a tubular confluent stream to equalize the flow rate of plastic circumferentially onto the cable. This has been done on a volumetric or flow rate basis, neglecting pressure and velocity distributions in the plastic stream. Though such designs have improved concentricity and roundness of tubular extrusions, they have not been satisfactory when the plastic utilized has been of a highly viscous or elastic type. Molten polypropylene or medium density polyethylene, for example, when moving through a conduit is subjected to shear stresses that result in substantial velocity and pressure gradients, particularly in channel bends and enlargements which do not readily return to steady state fluid flow conditions.

Two examples of the just described approaches are shown in U.S. Pat. Nos. 3,579,731 and 3,860,686. These patents disclose a cross head having a compensation or diverter tube formed with an annular restriction located downstream of a fluid delivery port. The restriction has an axial length that tapers from an axially long surface located radially adjacent the delivery port to an axially short surface located radially opposite the delivery port. This construction has been found to perform well where the taper is designed for specific flow rate of a plastic fluid of known viscosity. Its effectiveness, however, is diminished significantly when plastic fluids of other viscosities are used or where other flow rates are employed. Consequently, these approaches are not readily adaptable to changes in processing material, tooling and extrusion conditions. Furthermore, such prior art jacketing diverter tubes are difficult to fabricate due to their design complexity which leads to increased fabrication costs. In addition, use has been limited to the application of extruded insulation about wires as opposed to cables. It would be quite difficult to use this prior art apparatus in the manufacture of cables due to the size limitation which flow and pressure requirements impose on cable jacketing extruders.

Another problem resulting from existing cable jacketing diverter tubes is the precise alignment which must be maintained between the diverter tube and the incoming plastic flow stream. Also, weld lines formed on the tubular jacket are often weak.

More recently, an improved diverter tube has been described in U.S. Pat. No. 4,279,851. Here, a stream of plastic fluid is forced into the cross head and the stream is bifurcated into two branch stream. Each branch stream is channeled into two diametrically opposed locations about the cable where each stream is shaped with the selected prespread width. Each stream is spread from each of these locations into a confluent stream about the cable of tubular shape having a circumference of between 22 and 50 times the prespread width of each branch stream at an axial to lateral spread ratio of between 1:2 tangent 30° and 1:2 tangent 40°.

While this latter design is less complex and less costly than the former mentioned apparatus, there still exists the problem of the formation of weak weld lines and the lack of adaptability to rheological changes due to changes in processing material, tooling and extrusion conditions as well as a desire for further diverter cost reduction.

It can therefore be seen that need still remains for the development of practical and cost effective methods and means for extruding plastic jackets of uniform tubular wall thickness about cables and the like, especially, for methods and means which are adaptable to changes in processing materials, tooling and extrusion conditions.

SUMMARY OF THE INVENTION

A diverter for uniformly distributing extrudate from an extruder comprises a housing comprising a first cylindrical member having an extrudate entry port therein, a second cylindrical member adjustably coupled to the first member, and an axially extending central core member adjustably positioned within the first member and extending centrally through the first and second members, the members situated as to form an adjustable, circumferential, axially extending cavity within the housing, adjustment of the cavity being accomplished by altering the relative positions of the first and second members, said adjustment controlling the uniformity of extrudate emanating from the diverter and said cavity having three sections, a first or ring section which communicates with the extrudate entry port through which extrudate enters the cavity, a final or die section extending circumferentially and axially along the outer surface of the central core member and terminating in an annular extrudate outlet orifice, and an intermediate, narrow contraction section between and communicating with the ring and die sections, said contraction section being formed by an adjustable gap existing between opposing internal faces of the first and second members.

The invention further includes the method of jacketing a workpiece, e.g., a cable, advanced through the diverter.

BRIEF DESCRIPION OF THE DRAWINGS

DETAILED DESCRIPTION

A diverter generally functions to convert a rod type extrudate into a tubular shape. This tubular shaped extrudate may then be further sized through a separate die coupled to the outlet of the diverter or through a die which is an integral part of the diverter. Generally, tubing dies are characterized by relatively small pressure drops along the diverter path as compared with a pressure die which generally has a high pressure drop within the die. The novel diverter, however, can operate in either manner depending upon the nature and fit of the novel diverters central core member as will be more fully explained hereinafter.

Generally, the novel diverter comprises first and second cylindrical members having means for adjustably coupling one member with the other. The members have a hollow core through which either a core tube which is capable of passing a workpiece, e.g., a cable, is positioned or through which the workpiece is directly positioned without a separate core tube. When a core tube is employed, as is generally preferred, the tube is adjustably positioned with respect to the other members forming the die so as to provide an annular extrudate outlet. In this configuration the cable or other workpiece to be jacketed is passed through the center of the core tube. The size of the cable or other rod shaped workpiece which can be accommodated by the diverter can be altered within limits for a given core tube or one can simply replace the core tube with another core tube of different inner diameter in order to accommodate different size cables or the like. When operating in this manner the diverter functions as a tubing die and the cable becomes jacketed with extrudate outside of the confines of the die. Since cable is generally corrugated and does not have a uniform cross section, the tubing die configuration is preferred for forming jackets thereover.

When no core tube is present the workpiece to be jacketed becomes the central core and must fit snugly in the central axial cavity of the diverter such that extrudate cannot be forced backwards through the diverter but yet the fit must allow the workpiece to be freely drawn through the diverter. When operating in this manner the diverter functions as a pressure die and the workpiece becomes jacketed within the confines of the die.

Figure 1:
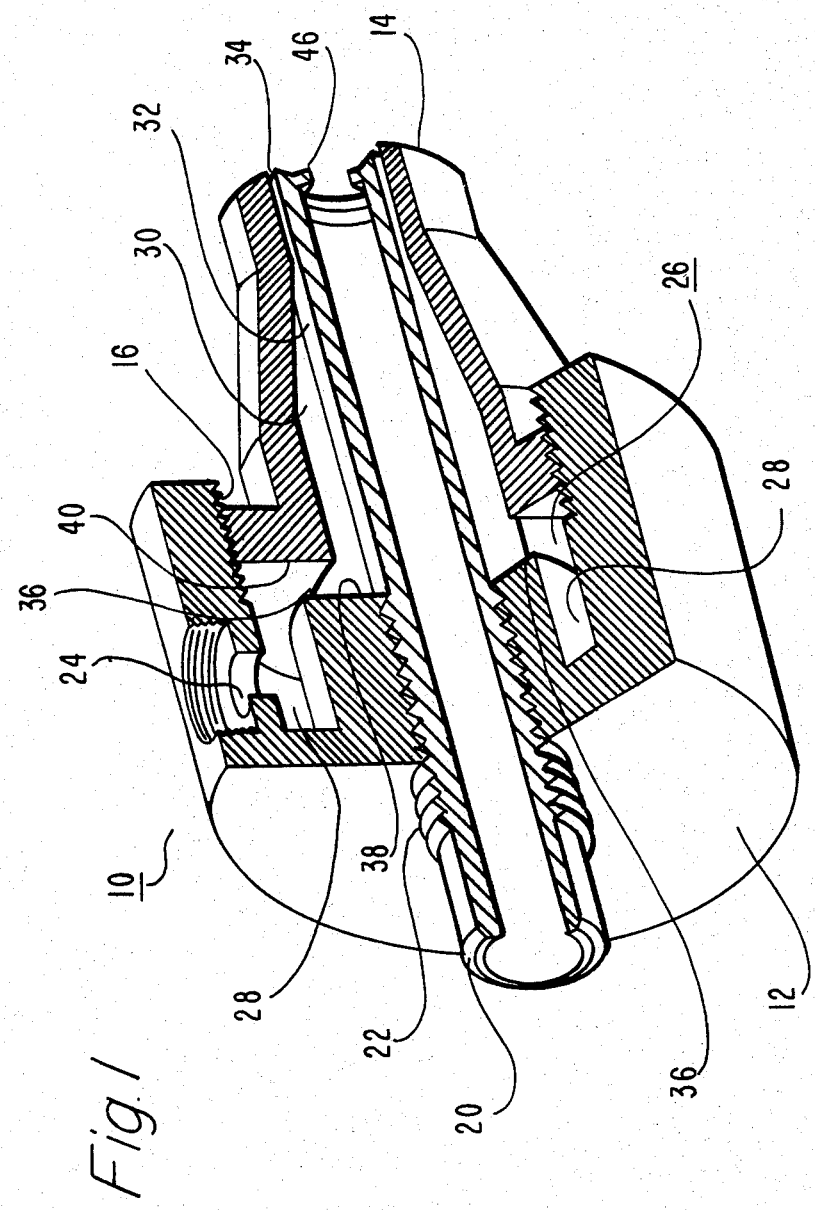
FIG. 1 is a partially cutaway isometric elevational view of a novel diverter-die assembly.
Figure 2:
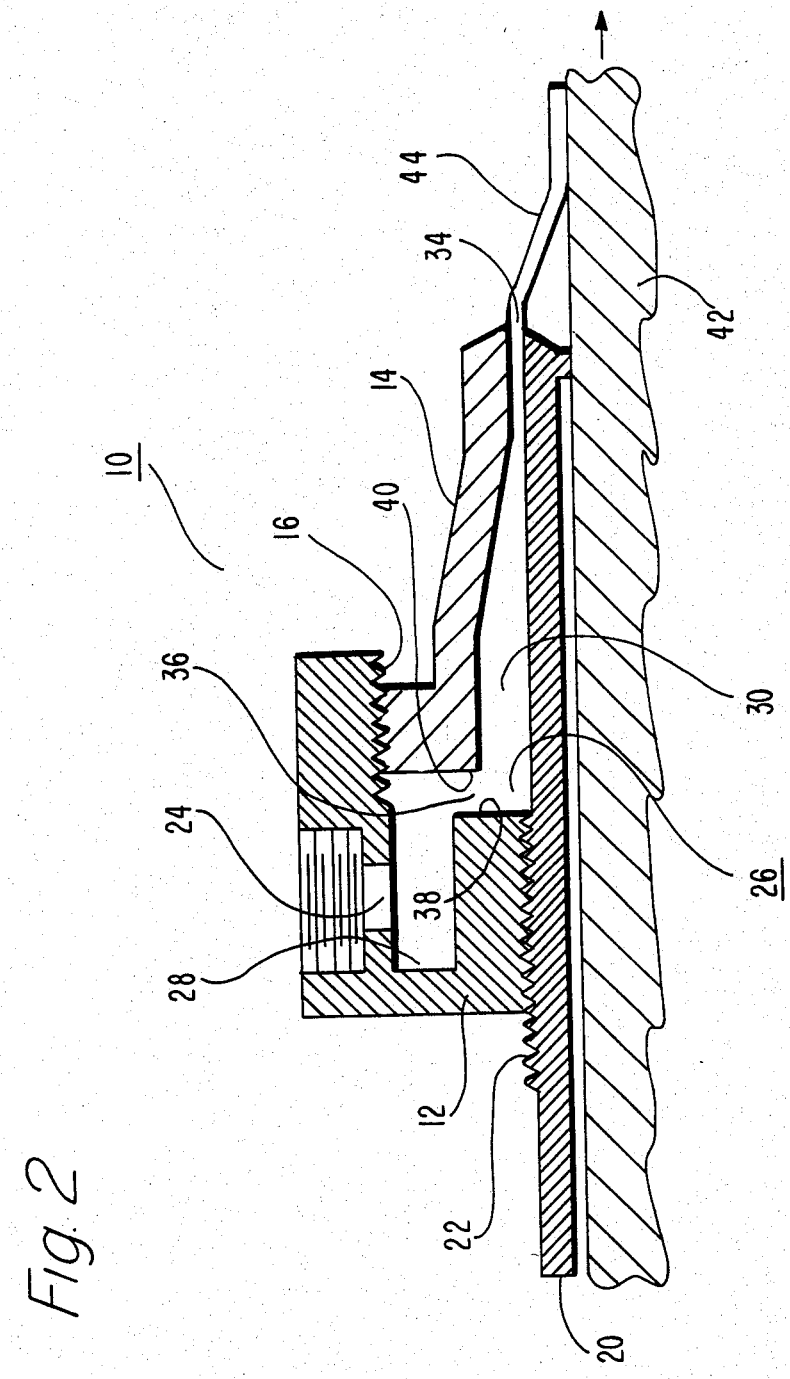
FIG. 2 is a cross-sectional view of the top half of the diverter-die shown in FIG. 1.

Referring now to FIGS. 1 and 2, there is shown a diverter-die suitable for use as a tubing die for jacketing a cable or other workpiece which is passed therethrough.

The diverter, as shown, comprises the part housing 10. The parts of the housing are a cylindrical outer member 12 having an essentially 'E'-shaped cross section, a cylindrical axially extending front member 14 which is adjustably coupled to the outer member 12 by means of screw threads 16 and 18 provided on the inner surface of the front portion of the outer member 12 and the outer surface of the rear portion of the front member 14, respectively, and a central core tube 20 member which extends axially through the center of the outer member 12 and front member 14 and is spaced from the inner surface of front member 14 and is adjustably coupled to the outer member 12 by means of a screw threads 22 provided therefor.

The outer member 12 is provided with an extrudate entry port 24 which accepts the extrudate from an extruder for transfer into an internal cavity 26 formed by spaces between the various housing members.

The cavity 26 comprises three section: a ring section 28 which communicates with the extrudate entry port 24, a final or die section 30 which extends circumferentially and axially along the top surface 32 of the central core member 20 and terminates in an annular extrudate outlet orifice 34 formed by a space between the central core member 20 and the front of the front member 14, and an narrow contraction section 36 between and communicating with the ring and die sections 28 and 30. The contraction section is formed by an adjustable gap existing between opposing internal faces 38 and 40 of the first and second members 12 and 14, respectively.

It should be understood that the various members can be adjustably coupled by means other than screwing one into the other as is well known in the art. Further, it should be understood that while the central member is shown here as a core tube, this tube can be replaced by the workpiece to be jacketed, in which case no screw threads would be provided around the central hole of the outer member and the workpiece would be of a size slidably but snugly fit in such hole thereby converting the tubing die shown into a pressure die.

As can be seen from FIG. 2 in the configuration shown, a cable 42 is passed through the core tube 20 and is coated with extrudate 44 outside the confines of the diverter. The front portion of the core tube 20 is preferably provided with an inwardly extending flange 46 which acts as a guide to keep the cable 42 centralized.

The screw adjustment which couples the outer and front members 12 and 14 is used to adjust the size of the gap forming the contraction section 36 of the diverter. It is this adjustment that balances and controls the uniformity of extrudate flow and hence the uniformity of the jacket formed over the cable. Further, it allows one to utilize the same diverter for varying extrudate rheologies resulting from varying the extrudate material or operating conditions. The adjustment of the core tube 20 allows one to align the front end of tne core tube 20 with the front face of the front member 14 so as to control the extrudate leaving the diverter and the point at which it contacts the cable so as to obtain a smooth bubble free jacket over the cable of the proper dimension.

While the diverter as shown includes an annular exit port which is the final desired size of the jacketing material, it should be understood that the diverter could have terminated in a die section which is wider than the final desired jacket thickness and a separate sizing die would then be coupled to the exit port of the diverter so as to obtain the final desired jacket thickness of the extrudate.

In the preferred embodiment of the invention, in order to achieve maximum uniformity of extrudate flow when the extrudate leaves the contraction section 36 of the diverter cavity 26 the gap forming the contraction section should be non-uniform, the gap being larger 180° from the vicinity of the entry port as compared to the vicinity of the entry port and preferably should be smallest near the entry port 24 and largest 180° from the entry port 24. This can be achieved by beveling one or both faces 38 and 40 forming the gap. Since the face 38 on the outer member 12 is stationary with respect to the entry port 24 it is best to bevel this face. If however, the front member 14 was coupled to the outer member by other than a rotary motion as in the screw coupling (e.g., by providing a keyed, slide fit with a set screw to lock it in any desired position) then beveling the face 40 of the front member 14 would be equally suitable. The angle between the opposing faces should generally be between about $\frac{1}{4}$° to 5° and is usually preferably between $\frac{1}{2}$° and 3° depending upon the size of the diverter and other factors. Improved results are generally obtainable with gap angles in this range. It should be noted that it has been determined that the actual optimum variation in gap size from entry port to 180° from the entry port is actually a non-linear change in gap size. However, the cost of providing such a non linear variation in gap size as opposed to the calculated added advantage over a linear change is not believed to be generally worthwhile. Generally, for purposes of comparison commonly employed spider dies (multi-channel dies) create a plurality of weld lines where the flows from each channel join. These weld lines are generally visually perceptable and are often sources of failure of the jacketed cable due to weakness of the jacket at the weld line. By employing the novel die of this invention, there is only one region where fluid flow joins (180° circumferentially from the extrudate entry port) and since this occurs in the first stage of the diverter cavity, i.e., the ring section, the weld lines generally become imperceptable and there is little or no reduction in material strength along this line.

Figure 3:
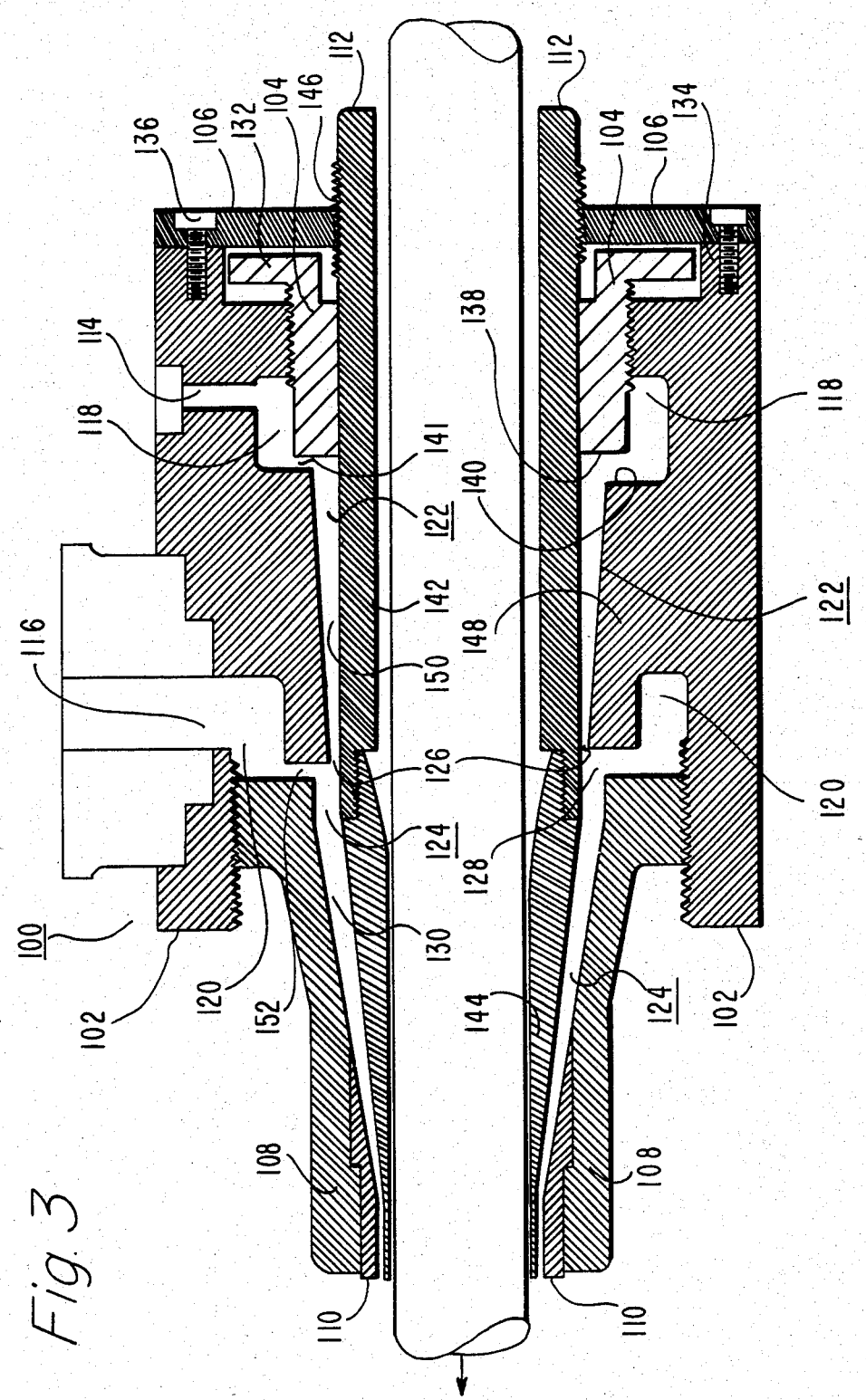
FIG. 3 is a cross-sectional view of a coextrusion diverter in accordance with the invention.

Referring to FIG. 3 there is shown a novel diverter useful for coextrusion so as to form a dual layer jacket. This diverter 100 may be described as a two stage, tandem diverter and is comprised of the following parts: a main cylindrical housing 102; a first stage cylindrical constriction gap forming member 104; a first stage cylindrical cover plate 106; a second stage cylindrical constriction gap forming member 108; a front die sizing member 110; and a core tube 112.

The housing 102 is provided with first stage and second stage extrudate entry ports 114 and 116, respectively. These entry ports 114 and 116 communicate with respective first and second stage ring sections 118 and 120 of the first stage and second stage cavities 122 and 124. An annular exit 126 of the first stage cavity 122 communicates with the base 128 of the die section 130 of the second stage cavity 124, at the rear most portion of the die section 130. The cavities 122 and 124 which extend circumferentially around and within the diverter 100 are formed by means of the combination of the contours of the housing 102 and the relative positions of the other members (104, 108, 110 and 112) within the housing 102.

More specifically, the contraction gap forming member 104 is adjustably mounted to the rear inner portion of the housing 102 by means of a screw thread provided therefor. The member 104 is cylindrical and has a rear outwardly extending flange portion 132 which lies within a rear flange portion 134 of the housing 102. The flange 132 is provided for ease of adjustment of the position of the member 104. Once adjusted, the cylindrical cover plate 106 is mounted to the housing 102 by means of a plurality of mounting bolts 136. The position of the member 104 within the housing 102 defines the first stage cavity ring section 118 and provides the adjustable gap between its front face 138 and an opposing internal face of the housing 140 which forms the first stage cavity contraction section 141. The core tube 112 which is shown to consist of a rear section 142 and a front section 144 screwed together at the beginning of the second stage cavity die section 130 extends axially through a central core of the housing 102 and abuts the inner cylindrical surface of the first stage contraction gap forming member 104. It is movable within the housing 102 by means of a screw coupling 146 to the inner surface of the cover plate 106. The core tube 112 is spaced from the central portion 148 of the housing 102 which space as extended back to the front face 138 of the first stage contraction forming member 104 forms the die section 150 of the first stage cavity 122.

The ring section 120 and the contraction section 152 of the second stage cavity 124 is formed by a space between the housing 102 and the rear face of the second stage contraction gap forming member 108. The die section 130 of the second stage cavity is formed by a space between the core tube 112 and the second stage contraction forming member 108 and the front sizing member 110 which surrounds the front section 144 of the core tube 112. The front sizing member 110 which is positioned within the member 108 so that in operation, the pressure causes them to be juxtaposed and constrained by mating lips on the two members. The gap size of the contraction section 152 of the second stage is varied by adjusting the screw position of the contraction forming member 108 which couples this member to the front portion of the housing 102. As can be seen from the figure the size of the contraction section gap is larger 180° from the extrudate entry ports as compared with the contraction gap size closest to the entry ports.

In operation, extrudate, e.g., a first polymer having a first viscosity is forced into the first stage entry port 114 where it enters the ring section 118 of the cavity 122 and distributes around the ring section to form a solid ring. The extrudate is then forced through the contraction section of the cavity in a balanced flow from around the ring section and thence into the die section of the first stage. The first polymer exits the annular exit of the first stage die section and enters the second stage die section. Extrudate, e.g., a second polymer having a viscosity the same as or different from the first polymer is then forced into the second stage entry port. This extrudate distributes throughout the ring section and contraction section of the second stage cavity and enters the die section of the second stage cavity where it overlies the extrudate of the first polymer therein. A coextruded, laminar, tubular shaped extrudate is thus forced out of the diverter. This coextruded material then is drawn down around the cable or other workpiece which is passed through the central cavity of the core tube.

EXAMPLE I

Employing a diverter as described with reference to FIGS. 1 and 2 wherein the width of the cavity ring section is 1.75 inches; the height of the ring section is 0.61 inches; the mean radius of the ring section (the distance from the center of the diverter outwardly to the center of the ring section) is 1.97 inches; the mean radius of the contraction section (the distance from the center of the diverter outwardly to the center of the contraction section) is 1.5 inches; and the length of the contraction section is 0.3125 inches for the jacketing of a 1½ inch diameter cable with Union Carbide 6059 linear low density polyethylene maintained at a temperature of 440° F., under a head pressure of less than 1,000 psi and at a flow rate of 120 lbs./hr. The following relationship between gap divergence angle, gap size and mean circumferential pressure deviation has been theoretically calculated. The zero shear rate viscosity of this polymer is 3.312 psi-sec$^n$ wherein n is the Power-Law Index (which in this case is 0.347). Also the pressure drop in the die section of the cavity is about 350 psi, as obtained in a separate calculation.

The mean circumferential pressure deviation is directly related to the uniformity of the extrudate jacket formed on the cable, i.e., the circumferential deviation in thickness along the cable.

The following table therefore sets forth the various deviations in jacket thickness as a function of contraction gap size and gap divergence angle. The table also shows the pressure drop in the contraction section of the diverter cavity in psi.

| Gap Divergence Angle (degrees) | Gap Size (inches) | Pressure Drop (psi) | Mean Pressure Deviation (percent) |
|---|---|---|---|
| 0.00 | .050 | 614.12 | 6.6% |
| 0.00 | .075 | 482.89 | 8.1% |
| 0.00 | .100 | 431.63 | 9.0% |
| 0.00 | .125 | 405.94 | 9.4% |
| 0.00 | .150 | 391.07 | 9.7% |
| .25 | .050 | 614.12 | 1.1% |
| .25 | .075 | 482.89 | 5.3% |
| .25 | .100 | 431.63 | 7.5% |
| .25 | .125 | 405.94 | 8.6% |
| .25 | .150 | 391.07 | 9.2% |
| .50 | .050 | 614.12 | 5.8% |
| .50 | .075 | 482.89 | 3.0% |
| .50 | .100 | 431.63 | 6.3% |
| .50 | .125 | 405.94 | 7.9% |
| .50 | .150 | 391.07 | 8.7% |
| .75 | .050 | 614.12 | 9.8% |
| .75 | .075 | 482.89 | 1.2% |
| .75 | .100 | 431.63 | 5.3% |
| .75 | .125 | 405.94 | 7.2% |
| .75 | .150 | 391.07 | 8.3% |
| 1.00 | .050 | 614.12 | 13.2% |
| 1.00 | .075 | 482.89 | .9% |
| 1.00 | .100 | 431.63 | 4.5% |
| 1.00 | .125 | 405.94 | 6.7% |
| 1.00 | .150 | 391.07 | 7.9% |
| 1.25 | .050 | 614.12 | 15.9% |
| 1.25 | .075 | 482.89 | 1.9% |
| 1.25 | .100 | 431.63 | 3.7% |
| 1.25 | .125 | 405.94 | 6.3% |
| 1.25 | .150 | 391.07 | 7.6% |
| 1.50 | .050 | 614.12 | 18.2% |
| 1.50 | .075 | 482.89 | 2.9% |
| 1.50 | .100 | 431.63 | 3.1% |
| 1.50 | .125 | 405.94 | 5.8% |
| 1.50 | .150 | 391.07 | 7.3% |
| 1.75 | .050 | 614.12 | 20.2% |
| 1.75 | .075 | 482.89 | 3.8% |
| 1.75 | .100 | 431.63 | 2.5% |
| 1.75 | .125 | 405.94 | 5.5% |
| 1.75 | .150 | 391.07 | 7.1% |
| 2.00 | .050 | 614.12 | 21.9% |
| 2.00 | .075 | 482.89 | 4.6% |
| 2.00 | .100 | 431.63 | 2.0% |
| 2.00 | .125 | 405.94 | 5.2% |
| 2.00 | .150 | 391.07 | 6.8% |
| 2.25 | .050 | 614.12 | 23.4% |
| 2.25 | .075 | 482.89 | 5.3% |
| 2.25 | .100 | 431.63 | 1.6% |
| 2.25 | .125 | 405.94 | 4.9% |
| 2.25 | .150 | 391.07 | 6.6% |
| 2.50 | .050 | 614.12 | 24.7% |
| 2.50 | .075 | 482.89 | 5.9% |
| 2.50 | .100 | 431.63 | 1.2% |
| 2.50 | .125 | 405.94 | 4.6% |
| 2.50 | .150 | 391.07 | 6.4% |
| 2.75 | .050 | 614.12 | 25.8% |
| 2.75 | .075 | 482.89 | 6.5% |
| 2.75 | .100 | 431.63 | 1.0% |
| 2.75 | .125 | 405.94 | 4.3% |
| 2.75 | .150 | 391.07 | 6.3% |
| 3.00 | .050 | 614.12 | 26.8% |
| 3.00 | .075 | 482.89 | 7.0% |
| 3.00 | .100 | 431.63 | 1.0% |
| 3.00 | .125 | 405.94 | 4.1% |
| 3.00 | .150 | 391.07 | 6.1% |

It can be seen from this table that there is an optimum gap size for any given gap angle and fixed extrudate material and operating parameters. However, the optinum gap size and/or gap angle will change with a change in extrudate material rheology. Since the novel diverter has an adjustable gap size, the optimum gap can be either recalculated or found empirically by varying the gap size during operation of the die while observing the uniformity of the jacket.

The table indicates that for the particular die parameters and particular extrudate conditions employed a minimum mean deviation is achieved at a gap divergence angle of 1.00° and a gap size of 0.075 inches. Here, the mean deviation is only 0.9%. While small deviations are also achievable at divergence angles of about ¼°, e.g., ¼° angle 0.050 inch gap gives a 1.1% deviation, the pressure drop in the contraction section under these parameters is greater than that generally considered as desirable. Under the above conditions, the pressure drop was 614.12 psi. An arbitrary maximum generally set is 500 psi.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A diverter for uniformly distributing extrudate from an extruder so as to coat with extrudate an elongated member passing axially through the center of the diverter comprises a housing having a first cylindrical member with an extrudate entry port therein, a second cylindrical member coupled to the first member and an axial core member adjustably positioned within the first member and extending centrally through the first and second members, the members situated so as to form a circumferentially and axially extending cavity within the housing, said cavity having three communicating sections, a ring section which communicates with the extrudate entry port, a die section extending circumferentially and axially along the outer surface of the axial core member and terminating in an annular extrudate outlet orifice, and a contraction section intermediate and communicating with said ring and die sections, said contraction section being formed by a gap between essentially flat opposing internal faces of the first and second members said gap varying in size between the vicinity of the entry port and 180° therefrom by means of a bevel on at least one of said opposing faces, said bevel forming an angle of from $\frac{1}{2}$° to 5° with respect to the opposing face.

2. The diverter recied in claim 1 including means for adjusting the gap size, said gap adjustment substantially controlling the uniformity of extrudate emanating from the diverter onto the elongated member passing therethrough.

3. The diverter recited in claim 2, wherein the members are coupled to each other by means of screwing one into the other.

4. The diverter recited in claim 2, wherein the width of said gap is greater than 180° circumferentially from where extrudate first enters the cavity as compared to the vicinity in which extrudate first enters the cavity.

5. The diverter recited in claim 4, wherein the gap is smallest in the vicinity where extrudate first enters the cavity and largest 180° from there.

6. The diverter recited in claim 4, wherein said divergence is between $\frac{1}{2}$° and 3°.

7. The diverter recited in claim 4, wherein said gap divergence from one part of the gap to another part of the gap is essentially linear.

8. The diverter recited in claim 2, wherein the axial core member is tubular so as to accommodate a workpiece therethrough to be coated with extrudate.

9. The diverter recited in claim 2, wherein the axial core member is the workpiece and wherein said member is slidably fit within the first member so as to allow the workpiece to be drawn through the diverter but yet prevent back flow of extrudate in the diverter.

10. The diverter assembly as recited in claim 2, wherein at least one of said opposing internal faces are movable so as to make the gap side adjustable by moving one part with respect to the other.

11. The diverter as recited in claim 10, wherein the gap of the contraction section from the first and second tandem diverters is non-uniform, said gap being greater in the vicinity 180° circumferentially from the portion of the gap nearest the entry port.

12. The diverter recited in claim 10, wherein the housing comprises an adjustably mounted axially extending tubular central core member through which the workpiece to be coated is drawn.

13. The diverter reicted in claim 1, wherein the members are coupled to each other by means of screwing one into the other.

14. The diverter recited in claim 1, wherein the contraction gap is non-uniform, said gap being greater 180° from where extrudate first enters the cavity as compared to the vicinity in which extrudate first enters the cavity.

15. The diverter recited in claim 14, wherein the gap is smallest in the vicinity where extrudate first enters the cavity and largest 180° from there.

16. The diverter recited in claim 14, wherein said divergence is between $\frac{1}{2}$° and 3°.

17. The diverter recited in claim 14, wherein said gap divergence is nonlinear.

18. The diverter recited in claim 1, wherein the axial core member is tubular so as to accommodate a workpiece therethrough to be coated with extrudate.

19. The diverter recited in claim 1, wherein the axial core member is the workpiece and wherein said member is slidably fit within the first member so as to allow the workpiece to be drawn through the diverter but yet prevent back flow of extrudate in the diverter.

20. A diverter assembly for coextruding extrudate onto a workpiece passing axially through the diverter comprises a multi-part housing defining first and second tandem diverters, each of said diverters having a circumferentially and axially extending cavity which communicates with an extrudate entry port, the cavity of each diverter having a ring section into which extrudate enters the cavity through said respective entry port, a final die section having an annular extrudate exit for sizing the extrudate leaving the respective cavity and a contraction section intermediate and communicating with said ring section and die section, said contraction section being defined by a gap between substantially flat opposing internal faces of respective housing member parts, at least one of said opposing faces being beveled at an angle of from $\frac{1}{2}$° to 5° with respect to the opposing face to form a gap which is narrower adjacent the entry port as compared with 180° circumferentially therefrom and wherein the annular exit of the die section of the first diverter is adjacent the rear of the base of the die section of the second diverter.

21. The diverter as recited in claim 20, wherein the gap of the contraction section from the first and second tandem diverters is non-uniform, said gap being greater in the vicinity 180° from the portion of the gap nearest the entry port.

22. The diverter recited in claim 20, wherein the housing comprises an adjustably mounted axially extending tubular central core member through which the workpiece to be coated is drawn.

23. A diverter for uniformly distributing extrudate from an extruder onto a workpiece passing axially through the diverter comprises a multi-part housing having a circumferentially and axially extending cavity therein, said cavity communicating with an extrudate entry port, the cavity having a ring section into which extrudate enters the cavity through said entry port, a final or die section extending circumferentially and axially along the housing and terminating in an annular exrudate outlet orifice, and a contraction section intermediate and communicating with said ring section and die section, said contraction section being defined by a gap between opposing, substantially flat internal faces of respective housing member parts, at least one of said opposing faces being beveled at an angle of from $\frac{1}{2}$° to 5° with respect to the opposing face to form a varying gap size.

24. The diverter recited in claim 23, wherein said opposing internal faces are movable with respect to one another such that one can adjust the gap by moving one part of the housing with respect to the other so as to alter the gap size, the adjustment of the gap substantially controlling the uniformity of extrudate emanating from the diverter.

* * * * *